(12) United States Patent
Hobbs

(10) Patent No.: US 11,221,093 B2
(45) Date of Patent: Jan. 11, 2022

(54) COATED PIPELINE

(71) Applicant: Subsea 7 (US) LLC, Houston, TX (US)

(72) Inventor: John Martin Hobbs, Katy, TX (US)

(73) Assignee: Subsea 7 (US) LLC, Houston, TX (US)

( * ) Notice: Subject to any disclaimer, the term of this patent is extended or adjusted under 35 U.S.C. 154(b) by 0 days.

(21) Appl. No.: 16/768,063

(22) PCT Filed: Nov. 28, 2018

(86) PCT No.: PCT/US2018/062870
§ 371 (c)(1),
(2) Date: May 28, 2020

(87) PCT Pub. No.: WO2019/108669
PCT Pub. Date: Jun. 6, 2019

(65) Prior Publication Data
US 2020/0355302 A1 Nov. 12, 2020

(30) Foreign Application Priority Data
Nov. 29, 2017 (GB) .................................... 1719831

(51) Int. Cl.
F16L 11/00 (2006.01)
F16L 9/04 (2006.01)
F16L 59/02 (2006.01)
F16L 59/14 (2006.01)

(52) U.S. Cl.
CPC ............. *F16L 9/042* (2013.01); *F16L 59/028* (2013.01); *F16L 59/14* (2013.01)

(58) Field of Classification Search
CPC .......... F16L 9/042; F16L 59/028; F16L 59/14
USPC ........................................ 138/149, 125, 144
See application file for complete search history.

(56) References Cited

U.S. PATENT DOCUMENTS

| | | | | |
|---|---|---|---|---|
| 3,934,064 A | * | 1/1976 | Lowthian | B29C 51/145 428/34.5 |
| 3,992,237 A | * | 11/1976 | Gerholt | F16L 59/028 156/86 |
| 4,308,895 A | * | 1/1982 | Greco | B29B 13/024 138/125 |
| 4,744,842 A | * | 5/1988 | Webster | F16L 59/028 156/78 |
| 4,752,497 A | | 6/1988 | McConkey et al. | |
| 8,789,562 B2 | * | 7/2014 | Kagoura | F16L 11/133 138/104 |
| 10,472,742 B1 | * | 11/2019 | May | H05K 1/111 |

(Continued)

FOREIGN PATENT DOCUMENTS

| | | |
|---|---|---|
| EP | 1 926 786 | 12/2010 |
| FR | 2 991 747 | 12/2013 |

(Continued)

*Primary Examiner* — James F Hook
(74) *Attorney, Agent, or Firm* — Levy & Grandinetti

(57) ABSTRACT

A subsea pipeline has a steel pipe surrounded by a thermally-insulating coating system having at least one thermal insulation layer. The thermal insulation layer has a thermally-insulating matrix in which elongate tensile elements of a thermoplastic polymer, such as monofilament yarns, are embedded. The pipe is preheated to promote bonding between the matrix and the elongate elements and between successive layers of the coating system.

31 Claims, 7 Drawing Sheets

(56) References Cited

U.S. PATENT DOCUMENTS

| | | | | |
|---|---|---|---|---|
| 2003/0127148 A1* | 7/2003 | Watkins | ............... | F16L 59/143 |
| | | | | 138/149 |
| 2004/0112450 A1* | 6/2004 | Hsu | ..................... | F28D 15/046 |
| | | | | 138/38 |
| 2006/0249215 A1* | 11/2006 | Bryant | ................. | F16L 11/083 |
| | | | | 138/125 |
| 2009/0320953 A1* | 12/2009 | Fletcher | ................... | B32B 1/08 |
| | | | | 138/148 |
| 2014/0102749 A1* | 4/2014 | Varkey | ................. | H01B 7/046 |
| | | | | 174/102 R |
| 2016/0003404 A1* | 1/2016 | Shibata | ............... | F16L 59/029 |
| | | | | 428/192 |
| 2019/0072227 A1* | 3/2019 | Segawa | ................. | F16L 59/06 |

FOREIGN PATENT DOCUMENTS

| | | |
|---|---|---|
| FR | 3 028 913 | 5/2016 |
| GB | 1 306 831 | 2/1973 |
| GB | 2 431 974 | 5/2007 |
| IT | 9012459 | 11/1991 |
| WO | WO 2007/085013 | 7/2007 |
| WO | WO 2015/112757 | 7/2015 |
| WO | WO 2016/118617 | 7/2016 |

\* cited by examiner

COATED PIPELINE

This invention relates to pipeline coatings. More specifically, the invention aims to improve the mechanical strength of thermally-efficient polymer coatings of subsea pipelines, as used in oil and gas production.

Subsea pipelines may be of composite materials but are most commonly cf steel, and are often coated and/or lined for thermal insulation and for protection against corrosion and abrasion. Such pipelines are used to transport crude oil and/or natural gas from a subsea wellhead across the seabed on the way to the surface. Typically, in offshore locations, the oil and gas flows up a riser from the seabed to the surface to undergo treatment and temporary storage at a surface installation.

Oil and gas are present in subterranean formations at elevated temperature and pressure, which may be increased by the injection of fluids such as steam. On production of the oil or gas, the produced fluid emerges from the wellhead and enters the pipeline in a hot, multi-phase state.

During subsequent transportation along the pipelines, the temperature and pressure of the produced fluid have to be kept high enough to ensure a sufficient flow rate cross the seabed and up the riser. In particular, various measures are taken to ensure that the internal temperature of the pipeline remains high, typically above 65° C. and in some cases above 200° C., despite thermal exchange with seawater which, for example, is at 4° C. below 1000 m depth.

Low temperature increases the viscosity of the produced fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. During shut-down, production is stopped and so no hot fluid flows through the pipeline. Consequently, to avoid clogging by solid-phase materials, mitigating fluid such as methanol or diesel oil is injected into the pipeline during shut-down. When production restarts, temperature within the pipeline must be increased quickly so that no plugs will form. It is also advantageous that the temperature of fluid remaining within the pipeline falls as slowly as possible after the flow of hot fluid has stopped.

Designers of subsea pipelines have adapted both active and passive approaches to thermal management, either individual combination. Active thermal management involving the use of heating elements is expensive and difficult to optimise.

Consequently, passive thermal management it thermal insulation is preferred for most applications. For example, the pipeline may be coated with a solid thermally-insulating and protective coating.

Thermally-efficient polymer coatings for pipeline typically have a multifunctional, layered sandwich construction. Commonly, the layers comprise, in radially-outward succession:
  a primer layer of fusion bonded epoxy (FBE) applied to the outside of a steel for corrosion protection;
  a thermal insulation coating, which may itself be applied and built up in multiple layers, to achieve a desired level of thermal performance expressed in terms of overall heat transfer coefficient (OHTC) or owl-down time; and
  optionally, an outer sheath or jacket that raps and surrounds the system, mainly to provide mechanical protection but also some additional thermal insulation.

Another option is far one or more adhesive layers to be applied before, between or under any of the aforementioned layers.

The thermal insulation coating is typically of polypropylene (PP) or polyethylene (PE), both being thermoplastics. Thermoset pipeline coatings of polyurethane (PU) are also known but are vulnerable to degradation due to hydrolysis promoted by heat emanating from within the pipeline in use. Hydrolysis is particularly significant under the high pressure conditions of deep water. Degradation or loss of adhesion of the coating may feed to a failure of thermal insulation and may also promote corrosion of the pipe.

Thermally-insulating coatings may take many forms, reflecting a trade-off between the required thermal efficiency or 'U-value', the application process, the thickness of the coating and the need for mechanical resistance. For example, pure polypropylene layers can crack or delaminate under bending during spooling or installation of a pipeline unless the necessary heating and curing cycles were executed perfectly. Weight can also be a concern when laying pipelines in deeper water, which strikes out long-proven solutions combining concrete and coal tar.

Additionally, the need for bonding between layers n prevent some combinations of materials being used together because they may be incompatible. For example, silicone cannot easily be used with polypropylene. In some cases, a specific bonding system has to be designed to join such materials.

Prior art processes for coating an elongate structure such as a subsea pipeline may be summarised as follows, and may be used alone or in combination:
  extruding layers onto each other, or co-extruding layers;
  wrapping tapes and layers of coating material, which tapes may be dry and cover by adhesive or may be pre-impregnated with resin that is cured in a subsequent operation;
  spraying a powder of polymer material onto a heated pipeline; or
  injection-moulding a polymer onto a pipe joint, which is typically 12 m or 24 m long. However the injection-moulding process has to be repeated for each pipe joint. Also, it is challenging to ensure homogeneous filling of a large mould, especially if the material is not an expanding foam.

EP 1926786 describes a coating system in which a thermal insulation layer is made by curing or crosslinking and bonding a mixture of epoxide-polyolefin (typically polypropylene) onto a primer layer of epoxy.

GB 2431974 discloses thermal coating system made of successive bonded layers of helically-wound insulation tapes. Solid beads are integrated between successive layers of tape.

Integrating material into the resin is also known. For example, U.S. Pat. No. 4,752,497 teaches applying a thermosetting resin as an insulation layer and integrating carbon fibres into a layer of resin to improve mechanical resistance.

In IT 1238756, tapes of mechanicals-resistant material are wrapped around a pipe and alternated with an extruded polyurethane resin. The mechanically resistant material is typically glass fibre and does not mix with the resin.

FR 2991747 discloses apparatus for repairing a pipeline by applying a tape. The tape is pre-impregnated with a polymerisable resin. The type and material of the tape are not specified but as its purpose is mechanical repair, those skilled in the art may preferentially choose glass-fibre tape. Similarly, the pre-impregnated reinforcement tapes of U.S. Pat. No. 5,030,493, WO 2015/112757 and WO 2016/118617 are based on fibrous materials comprising glass or carbon fibres. Despite their mechanical resistance, tapes comprising glass fibres or carbon fibres are too expensive for thermal coatings that require several layers, and may be difficult to bond with thermal insulation materials used in such coatings.

GB 1306831 describes apparatus for connecting insulated pipes. The pipes are insulated with a foam layer of a plastics material such as poyurethane. The foam layer is reinforced with a material such as glass tissue or polyester tissue to strengthen the insulating layer and to prevent the foam cracking as the pipe expands and contracts.

As new fields are being explored at greater depths and with higher well temperatures, there is a trend for the thickness of insulating coatings to increase. This makes it increasingly difficult to engineer PP insulation at a traditional cost level while balancing thermal performance against overall thickness.

Thus, the present invention takes another approach to constructing a mechanically-resistant thermal insulation coating, especially a coating that is highly resistant to shear stress.

In one sense, the invention provides a subsea pipeline comprising a steel pipe surrounded by a thermally-insulating coating system, wherein the coating system has at least one thermal insulation layer that comprises a thermally-insulating matrix embedding elongate tensile elements of a thermoplastic polymer. The elongate tensile elements are co-mingled with the matrix in a transition zone surrounding that element.

The elongate tensile elements, which are suitably yarns, may be of a polyolefin such as polypropylene. The matrix may comprise a polyolefin, an aerogel or an epoxy, alone or in combination.

The matrix may comprise mutually-immiscible insulation materials that are applied to the elongate tensile elements in respective layers. In that case, an inner one of said layers is suitably selected to promote bonding of an outer one of said layers to the elongate tensile elements. In some examples, the matrix may comprise a relatively viscous resin and a less viscous gel applied in respective layers to the elongate tensile elements.

Conveniently, the at least one thermal insulation layer may be formed by a tape, in which case a substantial proportion, a majority or substantially all of the elongate tensile elements may be substantially aligned in a longitudinal direction with respect to the tape.

The coating system may comprise further components, such as a corrosion-resistant layer between the pipe and the at least one thermal insulation layer and/or a mechanically-protective shroud on a radially outer side of the at least one thermal insulation layer.

The coating system may further comprise an adhesive layer, which may be of thermoplastic polymer, on a radially inner side of the at least one thermal insulation layer and on a radially outer side of any corrosion-resistant layer. Such an adhesive layer may also contain elongate tensile elements of a thermoplastic polymer.

Inner and outer thermal insulation layers may be bonded together, for example by being welded together along an interface or by being bonded together adhesively, for example by an intermediate layer of adhesive.

The inventive concept may also be expressed as a method of applying a thermally-insulating coating system to a subsea pipeline. That method comprises: pre-heating a steel pipe; and applying to the pre-heated pipe at least one thermal insulation layer that comprises a thermally-insulating matrix embedding elongate tensile elements of a thermoplastic polymer. The at least one thermal insulation layer may itself be pre-heated before its application to the pipe. Each elongate tensile element is co-mingled with the matrix in a transition zone surrounding that element.

A pre-heating temperature is suitably selected to bond the elongate tensile elements with the matrix. For example, the preheating temperature may be selected to soften, activate or liquefy at least an outer surface of the elongate tensile elements. Similarly, where the matrix is of a thermoplastic polymer, the pre-heating temperature may be selected to soften, activate or liquefy that thermoplastic polymer at an interface between the matrix and the elongate tensile elements. Alternatively, where the matrix of a thermoset polymer, the pre-heating temperature may be selected to promote, initiate or activate curing of that thermoset polymer.

The elongate tensile elements suitably pre-embedded in the matrix when the at thermal insulation layer is applied to the pre-heated pipe. However, in another approach, the matrix may be applied to the pre-heated pipe separately from the elongate tensile elements to form the at least one thermal insulation layer on the pipe. For example, the matrix may be applied to the pre-heated pipe after applying the elongate tensile elements to the pre-heated pipe.

An adhesive layer is preferably applied to the pipe fore applying the at least one thermal insulation layer to the pipe. Additional elongate tensile elements may be embedded into the adhesive layer after applying the adhesive layer to the pipe.

In summary, the present invention builds up thermal insulation in addition to an inner corrosion coating or primer layer and an optional outer mechanical protection layer, which can be of any type known in the prior art. The thermal insulation is built up as successive layers are applied to a heated substrate.

The layers may be foraminous or solid and preferably comprise a tape or sheet of a yarn or textile such as a polypropylene monofilament yarn. More generally, the layers may comprise various other elongate elements such as threads, filaments, fibres, strips or ribs. Those elements may be oriented randomly or directionally or may be aligned in arrays, such as substantially parallel or monoaxial arrays or intersecting biaxial or multiaxial arrays like a mesh or grid.

The elements may be brought together and linked without necessarily being welded or bonded, for example by weaving, knitting or compacting. Alternatively, the elements may be joined by welding or bonding or may even be formed together integrally, for example by axial or biaxial stretching of a perforated polymer sheet.

An insulator resin is applied onto the elongate elements. The elements bond to the resin layer, while retaining a fibrous r directional characteristic such as a mesh shape that reinforces the layers.

The invention allows insulator compounds to be applied not only as viscous resins but also as gels, and without moulding. The preferred combination is a polypropylene yarn coated with a thick resin layer of polypropylene, although an additional layer of aerogel or epoxy may be applied on and supported by such a structure.

In preferred embodiments, the invention provides a coating system for insulating a steel subsea pipeline. The coating system comprises: an epoxy corrosion coating layer, for example of FBE; and at least one thermal insulation layer. The thermal insulation layer comprises a polyolefin monofilament yarn wrapped around a previous layer and a thermally-insulating resin impregnating that yarn.

The yarn may be a mesh and is preferably thermoplastic. For example, the polyolefin may be polypropylene. Conversely, the resin may contain a polyolefin, an aerogel or an epoxy, alone or in combination.

The resin may be a mixture of a relatively viscous resin and a less viscous gel. More generally, a matrix such as a resin may comprise two non-miscible insulation materials applied to the yarn in respective layers. In that case, the first, inner layer may allow or promote bonding of the second, outer layer to the yarn. The first layer may, for example, be of viscous polypropylene.

Each layer of thermal insulation may, for example, be about 2 mm thick, and four to eight layers, preferably six layers, of thermal insulation may be applied successively. A protective layer may be applied onto the, or the outer, layer of thermal insulation.

Preferred embodiments of the invention may also be expressed as a method for building a thermal insulation coating layer on a steel pipe for underwater use. The method comprises: pre-heating a steel pipe provided with a corrosion-resistant layer; and applying at least one layer of polyolefin monofilament yarn and a thermally insulating resin.

The pre-heating temperature is preferably selected to bond the thermoplastic yarn with the resin, which may be thermoset or thermoplastic. For example, the pre-heating temperature may soften, activate or liquefy at least an outer surface of the thermoplastic yarn. Similarly, the pre-heating temperature may soften, activate or liquefy a thermoplastic resin, promoting bonding or welding at the interface between the resin and the yarn. Bonding or welding may also be promoted at the interface between the resin and the yarn if the pre-heating temperature promotes, initiates or activates curing of a thermoset resin.

The resin may pre-impregnate the yarn so as to be applied with the yarn, or may be applied separately from the yarn. For example, the resin may be applied by extruding, pouring or spraying. The resin may be cured or hardened in a subsequent step.

An advantage of the invention is that it lends itself to use insulating materials that are vulnerable to volatile solvents, such as aerogels.

Thus, the invention provides a subsea pipeline that comprises a steel pipe surrounded by a thermally-insulating coating system having at least one thermal insulation layer. The thermal insulation layer comprises a thermally-insulating matrix in which elongate tensile elements of a thermoplastic polymer, such as monofilament yarns, are embedded. The pipe is pre-heated to promote bonding between the matrix and the elongate elements and between successive layers of the coating system.

In order that the invention may be more readily understood, reference will now be made, by way of example, to the accompanying drawings, in which:

FIG. 6 is a schematic cross-sectional view of thermoplastic yarns in a matrix, the yarns being coated in a variant of the arrangement shown in FIG. 4a;

Figure 1:
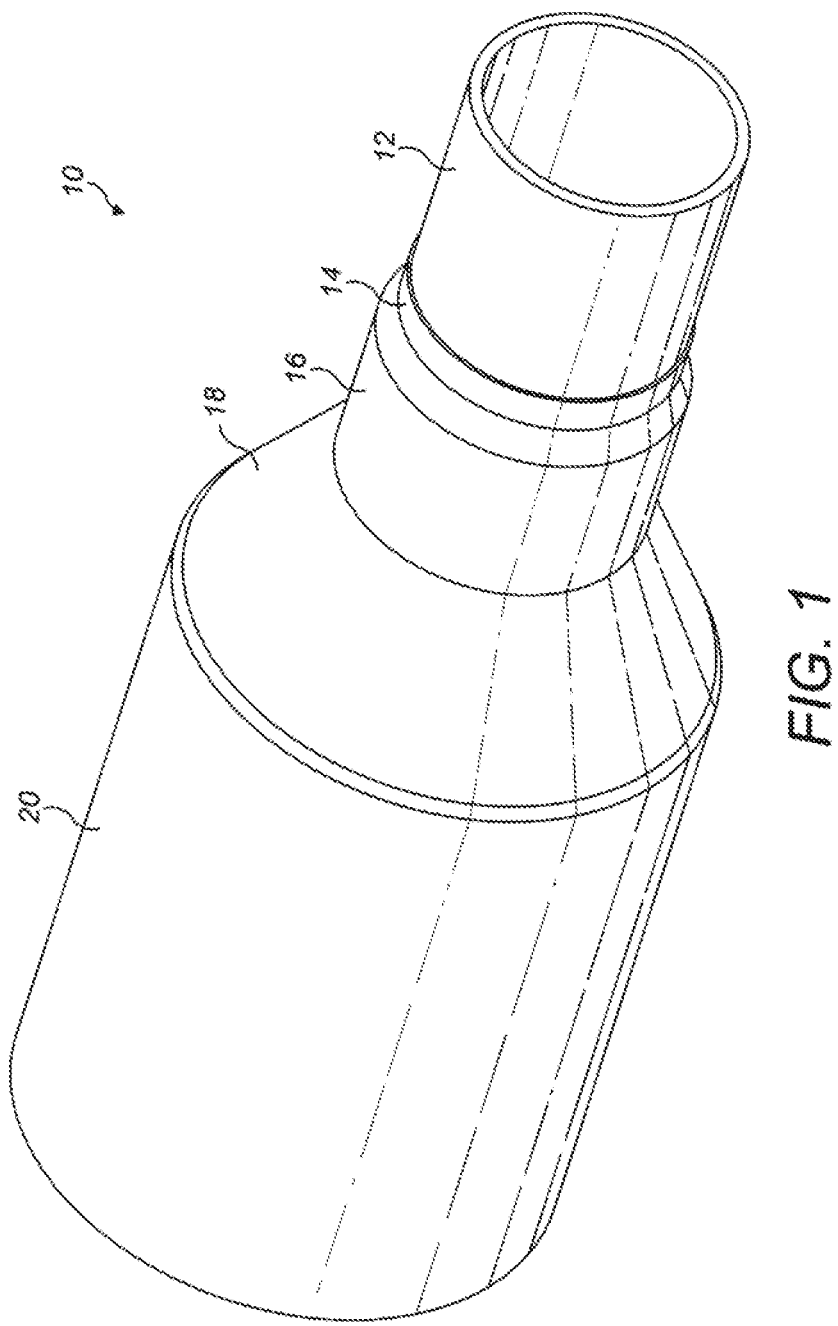
FIG. 1 is a cut-away perspective view of a portion of subsea pipeline made in accordance with the invention.
Figure 2:
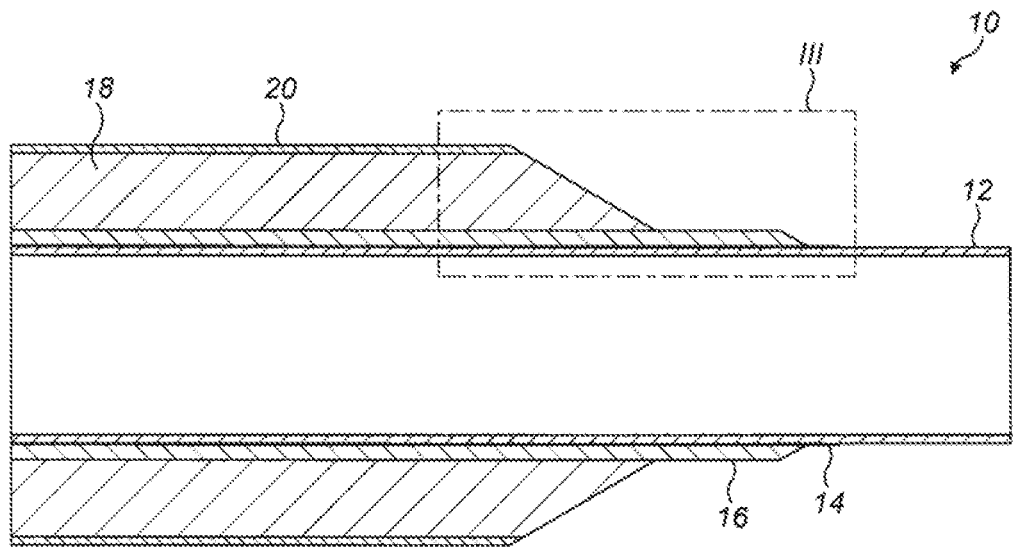
FIG. 2 is a sectional side view of the portion shown in FIG. 1.
Figure 3:
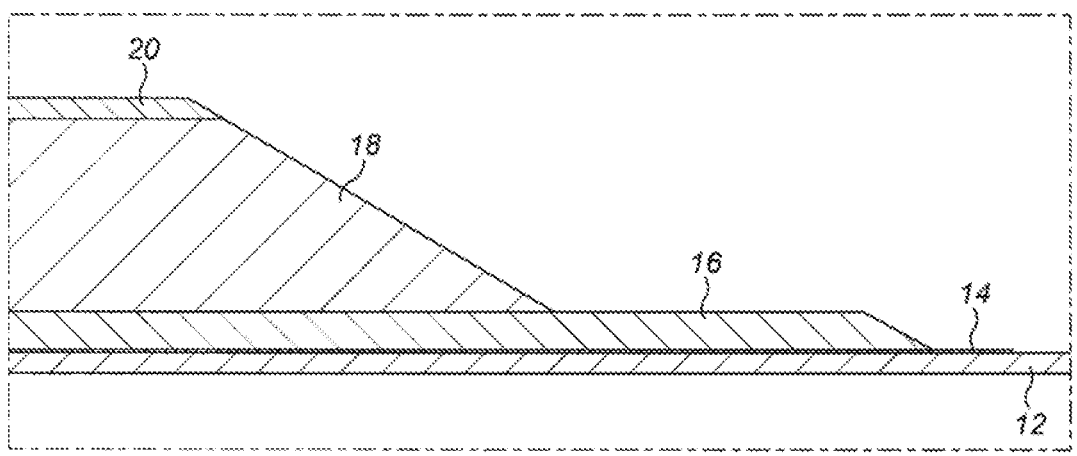
FIG. 3 is an enlarged detail view corresponding to Detail III of FIG. 2.

Referring firstly to FIGS. 1 to 3 of the drawings, a subsea pipeline 10 of the invention comprises, in radially-outward succession:

a pipe 12, which is typically of steel and may optionally be lined and/or of twin-wall pipe-in-pipe (PiP) construction;

an anti-corrosion layer 14, for example of fusion-bonded epoxy (FBE);

an adhesive layer 16, for example of polymer such as polypropylene (PP);

an insulating layer 18, which is itself built up in layers in accordance with the invention, as will be explained; and an outer protective sheath 20, which may also be of a polymer such as PP.

Figure 4A:
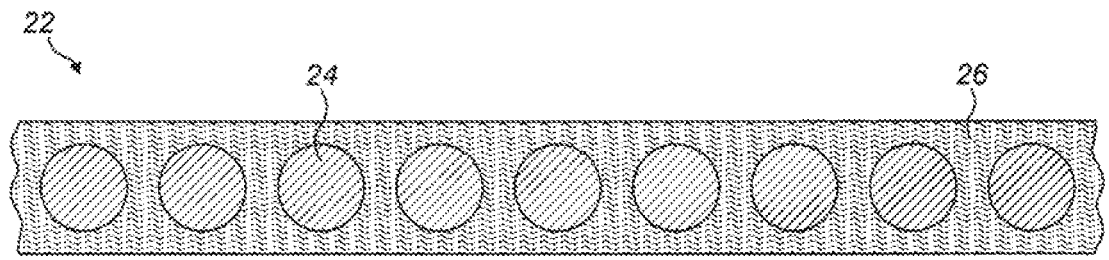
FIGS. 4a and 4b are schematic partial cross-sectional views of a tape in accordance with the invention comprising thermoplastic yarns in a matrix, FIG. 4a showing the yarns before heating and FIG. 4b showing the yarns after heating.
Figure 4B:
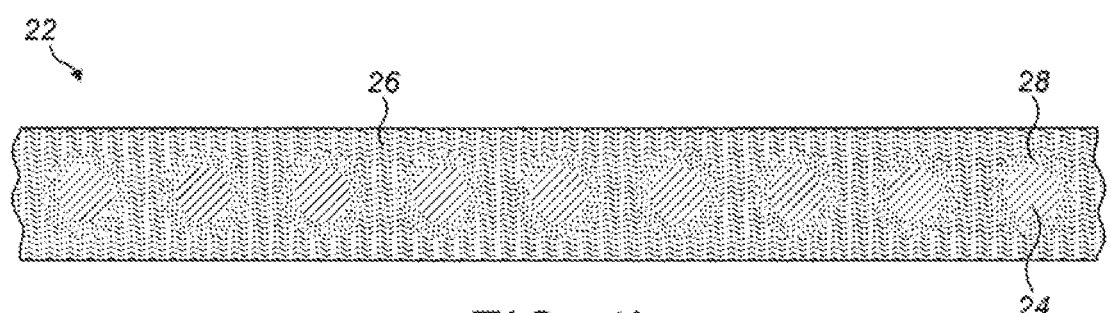

FIGS. 4a and 4b show an insulating tape 22 in accordance with the invention, which is wound around the adhesive layer 16 of the pipe 12 in longitudinally- and radially-successive layers to build up the insulating layer 18 to a desired thickness. Typically the tape 22 will be wound around the pipe 12 in an overlapping helical arrangement.

In this example, the tape 22 comprises thermoplastic yarns 24 embedded in an insulating resin matrix 26. The matrix 26 may be of thermoplastic or thermoset polymers. The yarns 24 are a preferred example of elongate tensile elements used in the invention but such elements may take other forms, as will be explained.

These drawings are schematic and much-simplified: for example, there will typically be many more yarns 24 across the full width of the tape 22 and the yarns 24 may be in more than one layer within the thickness of the tape 22. Similarly, the yarns 24 are shown here as being substantially circular in cross-section. However, yarns 24 or other elongate elements could have other cross-sectional shapes, such as flattened strips.

The yarns 24 in this example are aligned unidirectionally, preferably parallel to a feed direction extending along the length of the tape 22. However, yarns 24 or other elongate elements could have other alignments or be randomly aligned, for example as chopped strands. Also, the yarns 24 or other elongate elements may be pre-stretched along their length to align their polymer chains.

The matrix 26 is shown here as extending continuously between and joining the yarns 24. However, if yarns 24 or other elongate elements instead intersect with each other, the matrix 26 could instead surround the individual yarns 24 and leave a space without the resin of the matrix 26 between adjacent yarns 24. Thus, the tape 22 may be penetrated by gaps or openings between the yarns 24 and hence could be foraminous.

If a thermoplastic polymer used in the matrix 26, the tape 22 may be heated before or after being applied to the pipe 12. More generally, the thermoplastic polymer may be at a temperature substantially below its meting point, hence solid; at a temperature substantially above its melting point, hence liquid; or at a temperature close to its melting point, hence softened, tacky or sticky, when or after the tape 22 is applied to the pipe 12.

The tape 22 may also be heated before or after being applied to the pipe 12 if a thermoset polymer is used in the matrix 26. In this respect, curing and hardening of the thermoset polymer may be promoted or accelerated by heat. Thus, the thermoset polymer may be of a liquid, tacky or sticky consistency when the tape 22 is applied to the pipe 12 and subsequent curing and hardening of the polymer may be promoted by heating when the tape is on the pipe 12.

FIG. 4a shows the tape 22 before being heated. When the tape 22 is heated close to or above the melting point of the thermoplastic used for the yarns 24, the yarns 24 soften or melt and diffuse or key into the surrounding matrix 26 as shown in FIG. 4b. The result is that after heating and cooling, the interface between each yarn 24 and the surrounding matrix 26 is a transition zone 28 around the core of the yarn 24 in which the yarn 24 and the matrix 26 mix, co-mingle or engage.

By virtue of the transition zone 28, a strong and robust bond is achieved between the yarn 24 and the matrix 26. However, the beneficial structure, disposition and directionality of the yarns 24 remains intact. The effect is enhanced if the matrix 26 is itself of thermoplastics or is of a thermoset polymer that is not yet fully cured, hardened or cross-linked when heated.

In each case, the tape 22 may be heated after being applied to the pipe 12 by heat applied directly to the tape 22 and/or by heat transmitted to the tape 22 from pre-heated layers beneath the tape 22, including previously-applied layers of the tape 22 itself. A layer of tape 22 may be heated before being applied over whatever layers have previously been applied to the pipe 12.

Figure 5A:
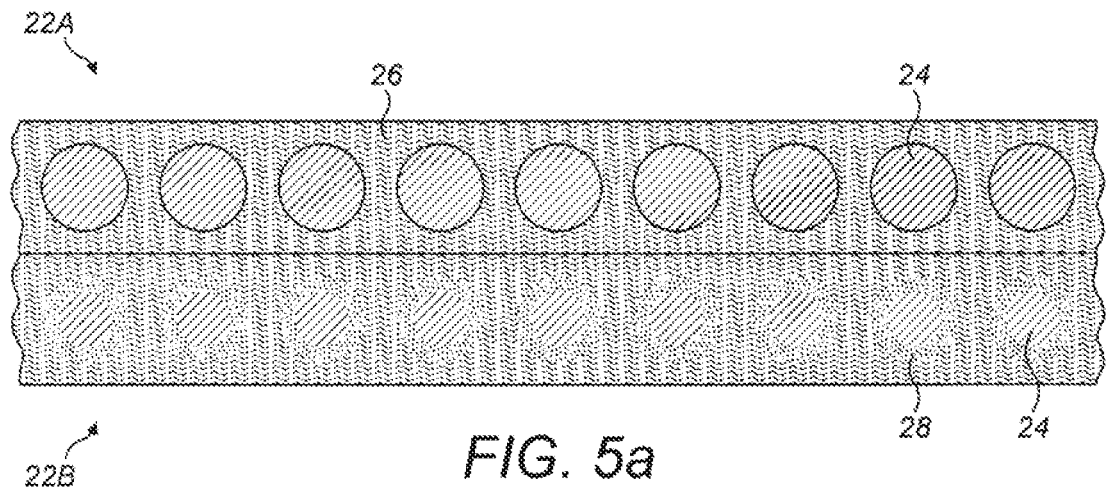
FIGS. 5a and 5b are schematic cross-sectional views of layer of tape in accordance with the invention laid on another, pre-heated layer of tape.
Figure 5B:
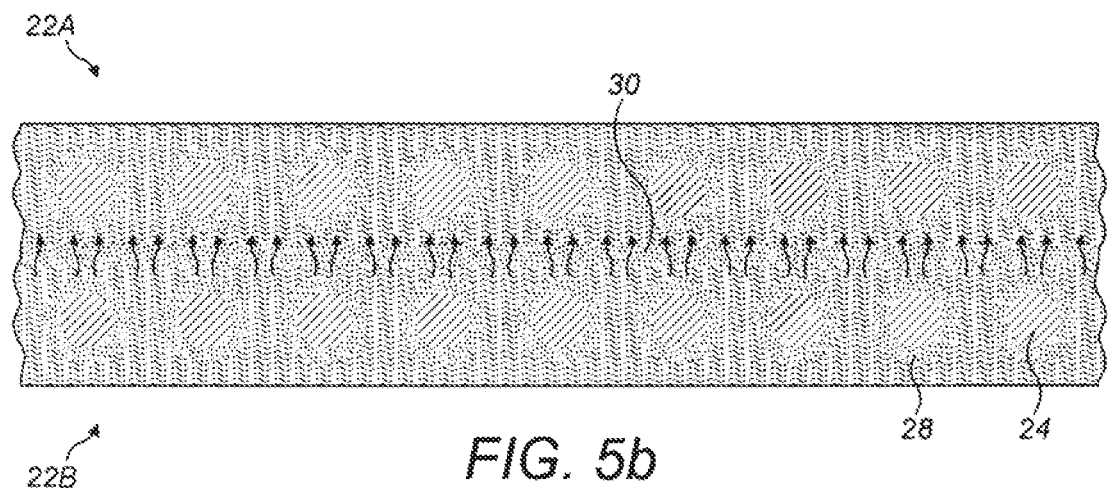

FIGS. 5a and 5b illustrate one such possibility, where an outer layer of tape 22A is applied over a previously-applied inner layer of tape 22B. The inner layer of tape 22B has been pre-heated and remains around or above the melting point of its thermoplastics. This has caused its thermoplastic yarns 24 to soften and melt partially to form a transition zone 28 between each yarn 24 and the surrounding matrix 26. In this example, the matrix 26 is also of thermoplastics and therefore has also been softened by pre-heating.

FIG. 5a shows the outer layer of tape 22A immediately after being applied over the inner layer of tape 22B. Initially, even if there has been some pre-heating of the outer layer of tape 22A, the thermoplastics in the outer layer of tape 22A may be substantially below melting point and hence may be solid as shown. Next, as shown in FIG. 5b, heat from the inner layer of tape 22B is conducted into the contacting outer layer of tape 22A.

The conducted heat softens the thermoplastic in the outer layer of tape 22A, promoting formation of a transit zone 28 between each yarn 24 and the surrounding matrix 26. Heating the outer layer of tape 22A also promotes the formation of a weld or bond at the interface 30 where the softening matrix 26 of the inner layer of tape 22B co-mingles with the soft matrix 26 of the outer layer of tape 22A.

The result is to build up a robust, fibre-reinforced, insulating body around the pipe 12, in which the yarns of each layer 22A, 22B are bonded strongly to the surrounding matrix and the adjoining layers 22A, 22B are bonded strongly to each other. This produces an insulating layer 18 that is not just highly resistant to shear stress but is also of exceptional thermal efficiency for a given thickness.

It would of course be possible for successive layers of tape 22A, B to have yarns or other elongate tensile elements oriented at different angles with respect to the central longitudinal axis of the pipe 12. For example, the tape 22A of one layer could be applied to the pipe 12 at a first helical angle and the tape 22B of the next layer could be applied to the pipe 12 at an opposite helical angle. Alternatively, the respective tapes could have differently-oriented reinforcements.

Figure 6:
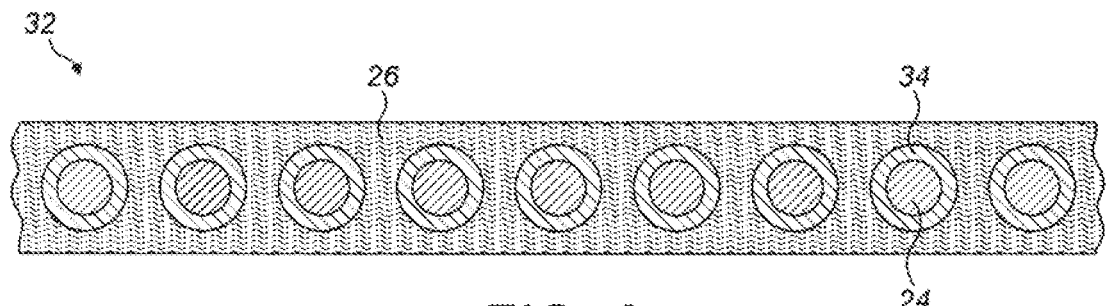

FIG. 6 shows a variant tape 32 in which an intermediate layer 34 is provided between the matrix 26 and each elongate element, exemplified here again as a yarn 24. The matrix 26 may therefore be regarded as comprising an outer layer around the inner, intermediate layer 34. The intermediate layer 34 may, for example, comprise a relatively viscous resin and the outer layer of the matrix 26 may comprise a less viscous gel such as an aerogel. The intermediate layer 34 promotes bonding of the outer layer to the yarn 24.

Figure 7:
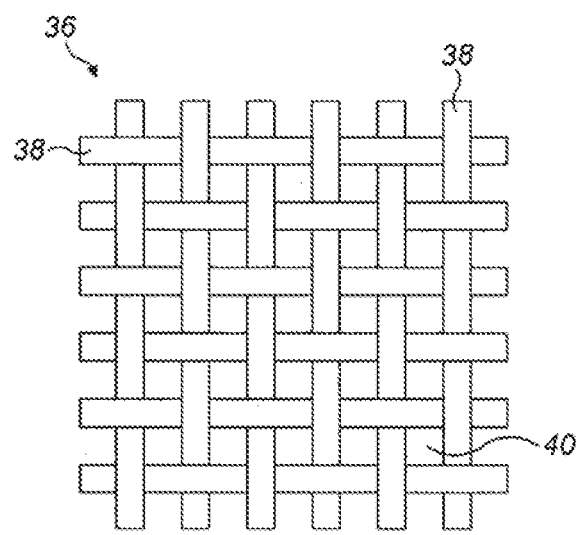
FIG. 7 is a schematic plan view of an alternative tape of the invention formed from interwoven elements.

FIG. 7 shows a further variant tape 36 in which the elongate elements are defined by strips 38 that are arranged as a mesh, in this example being woven together in a warp-and-weft arrangement. Each strip 38 has a core of thermoplastic polymer coated with a matrix that, by analogy with the preceding embodiments, may be of thermoplastic or thermoset polymer. Similarly, there may be an intermediate layer between the core and a surrounding matrix like the embodiment shown in FIG. 6.

Whilst the tape 36 shown in FIG. 7 has openings 40 between the strips 38, the matrix surrounding the strips 38 could instead extend continuously between the strips 38 like the matrix 26 of the preceding embodiments to fill the openings 40. In other variants, the intersecting elongate elements exemplified by the strips 38 need not intersect orthogonally as shown in the tape 36 of FIG. 7 but could instead be at various relative orientations.

Figure 8:
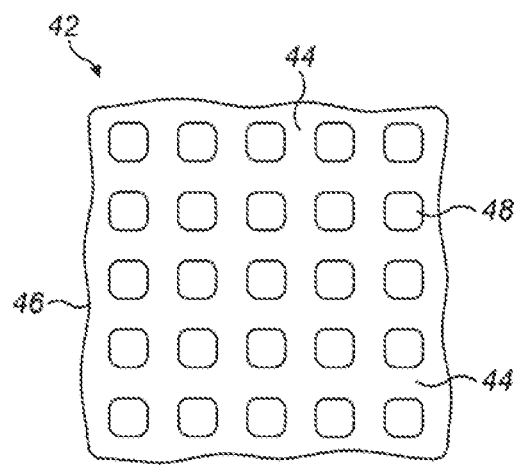
FIG. 8 is a schematic plan view of an alternative tape of the invention formed from a perforated sheet.

FIG. 8 shows a yet further variant tape 42 in which intersecting elongate elements 44 are formed together integrally, in this case by biaxial stretching of a polymer sheet 46, which may be perforated with a two-dimensional array of holes 48 as shown to form a grid or mesh. As before, the elements 44 have a core of thermoplastic polymer coated with a matrix that may be of thermoplastic or thermoset polymer; again, the matrix surrounding the elements 44 could instead extend continuously between the elements 44 to fill the holes 48. Also, there could be an intermediate layer between the core and a surrounding matrix like the embodiment shown in FIG. 8.

Figure 9:
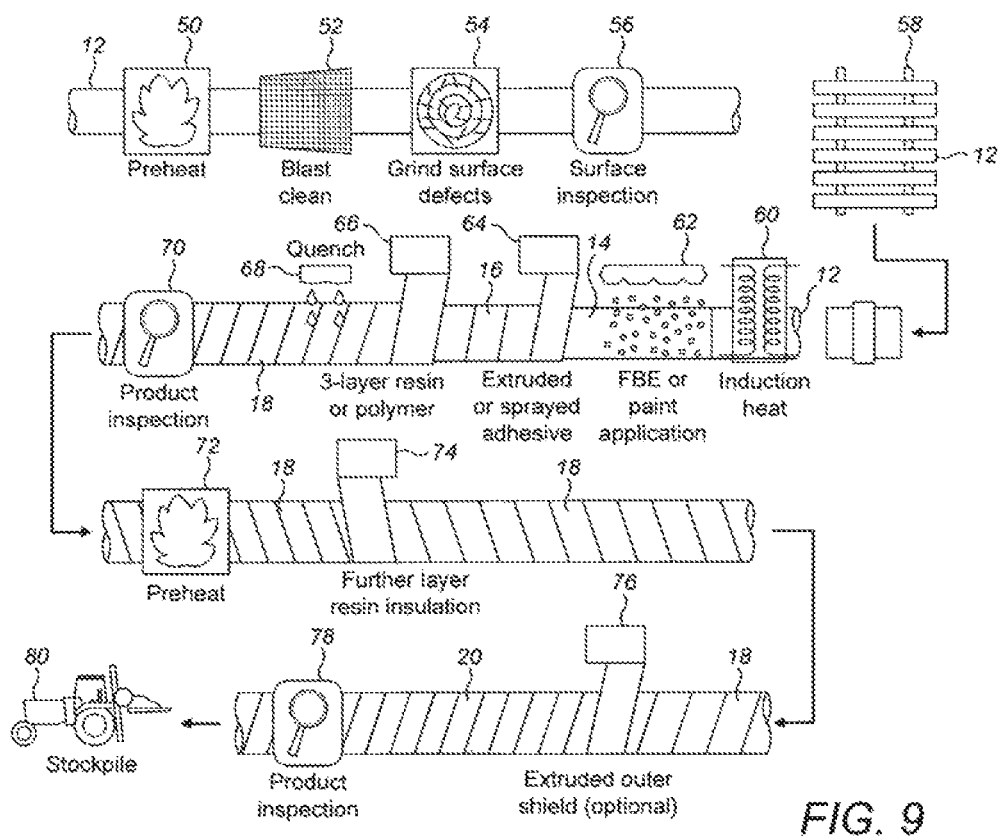
FIG. 9 is a flow production process of the invention.

Turning next to FIG. 9 of the drawings, this flow diagram shows a production process using a tape of the invention applied to a length of pipe 12, such as a pipe joint with a standard length of 12 m or 24 m. The process of the invention is apt to be incorporated into existing factory supplier processes.

In a preliminary surface-preparation process that does not form part of the inventive concept, the pipe 12 is pre-heated at 50 and blast-cleaned at 52 before surface defects are remedied at 54, typically by grinding them off. Following surface inspection at 56, the pipe 12 may be stored at 58 with similar lengths of pipe 12 in readiness for coating.

The coating process starts with induction heating of pipe 12 at 60. A corrosion-resistant layer 14 of FBE or paint is then applied to the exterior of the hot pipe 12 at 62. Next, an adhesive layer 16 is extruded or sprayed over the still-hot corrosion-resistant layer 14 at 64, followed by the application of a tape comprising polymer resin in up to three layers at 66 to start building up the insulating layer 18. The pipe 12 is then quenched at 68 before being inspected at 70.

On passing inspection at 70, the pipe 12 is again preheated at 72 before the application of further layers of tape at 74 to build up the insulating layer 18 further. Quenching, inspection and preheating steps may be repeated before further applications of tape if the residual heat of the pipe 12 is insufficient to complete the coating process.

The resin and the yarn of the tape cure together, with the yarn providing transportation of the resin to the pipe 12 from the loading point.

When the insulating layer 18 has reached the required thickness, a protective outer sheath 20 is extruded onto the pipe 12 at 76 before final inspection at 78. The finished product is then ready to be transported at 80 for stockpiling.

Figure 10:
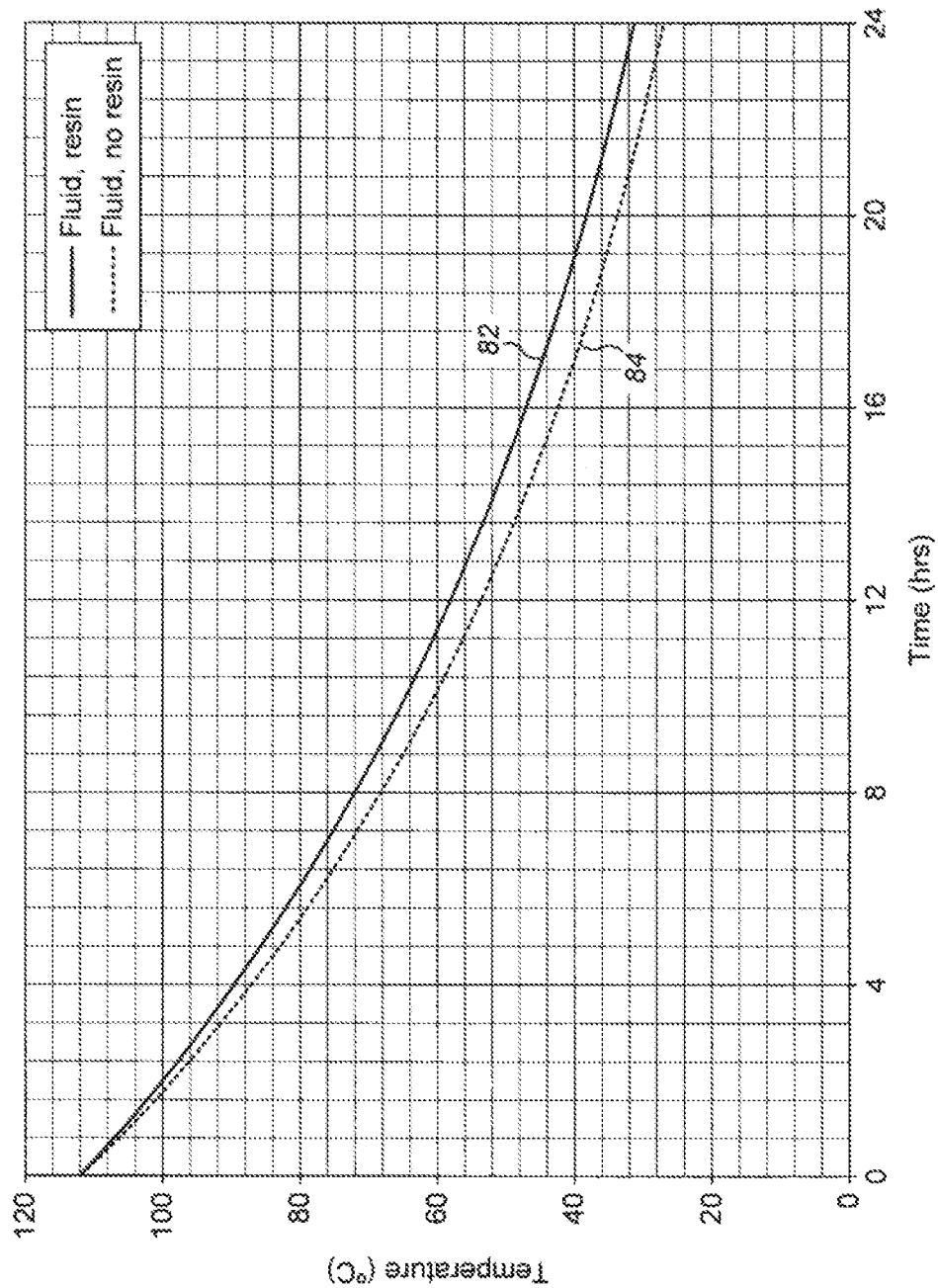
FIG. 10 is a graph that shows how produced fluid within a pipeline cools over time after a shutdown as a measure of thermal efficiency, comparing the effect of a resin between layers of yarn, in accordance with the invention, against simple wraps of polypropylene yarn without resin, as known in the prior art.

Turning finally to FIG. 10, this graph shows evolution of the temperature of produced fluid within a pipeline after a shutdown, hence without further introduction of hot fluid. This is therefore a measure of the thermal efficiency of the system that comprises the pipe and the thermal coating.

In this example, the initial temperature fluid within the pipeline is 115° C. It is generally important that the temperature of that fluid remains above 16° C. after eight, twelve and sixteen hours post-shutdown. The greater the margin above 16° C. at sixteen hours, the better.

It will be apparent from FIG. 10 that using a resin between layers of yarn, as shown by curve 82, is advantageous over the simple use of wraps of polypropylene yarn, as shown by curve 84. Sixteen hours after shutdown, the fluid in the pipeline is predicted to be about 5° C. warmer by virtue of the invention. This provides a significant safety margin, allowing a longer period post-shutdown before there is a risk of the pipeline becoming blocked.

Many variations are possible in addition to those mentioned above, without departing from the inventive concept. For example, standard FBE coatings could be replaced with an insulating resin formulation applied directly to a blast-cleaned metal substrate of the pipe.

A first layer comprising monofilament yarn may be fed under tension and applied with, or onto, adhesive layers applied to the preheated pipe. The yarn and the adhesive layers may be of thermoplastics, for example PP. Further layers of monofilament yarn in a resin matrix may be built in layers about 2 mm thick to build the insulating layer to a thickness of say 12 mm, hence comprising a total of six such layers. Optionally, a light adhesive layer may be applied onto each preceding layer, for example by spraying.

The PP monofilament yarn melts and bonds onto the adhesive layer and supports the following resin/insulation matrix layers to form a cohesively strong thermally-superior layer, closest to the pipe surface.

Thermal modeling indicates that, by virtue of the invention, surface temperatures under a syntactic polypropylene layer may be reduced by about 11%-12% with a 12 mm insulating layer. Thus, a typically 90 mm-thick PP coating could be reduced in thickness to say 72 mm while maintaining the thermal insulation capability of the system.

The invention claimed is:

1. A subsea pipeline comprises a steel pipe surrounded by a thermally insulating coating system, wherein the coating system has at least one thermal insulation layer that comprises;
   a thermally insulating matrix; and
   elongate tensile elements of a thermoplastic polymer embedded in the thermally-insulating matrix;
   wherein the thermally-insulating matrix impregnates a surrounds the elongate tensile elements; and each elongate tensile element is co-mingled with the surrounding, impregnating matrix in a transition zone surrounding that element.

2. The pipeline of claim 1, wherein the elongate tensile elements are yarns.

3. The pipeline of claim 1, wherein the elongate tensile elements are of a polyolefin.

4. The pipeline of claim 3, wherein said polyolefin is polypropylene.

5. The pipeline of claim 1, wherein the matrix comprises a polyolefin, an aerogel, or an epoxy, alone or in combination.

6. The pipeline of claim 1, wherein the matrix comprises mutually immiscible insulation materials applied to the elongate tensile elements in respective layers.

7. The pipeline of claim 6, wherein an inner one of said layers is selected to promote bonding of an outer one of said layers to the elongate tensile elements.

8. The pipeline of claim 1, wherein the matrix comprises a relatively viscous resin and a less viscous gel applied in respective layers to the elongate tensile elements.

9. The pipeline of claim 1, wherein the at least one thermal insulation layer is formed by a tape and the elongate tensile elements are substantially aligned in a longitudinal direction with respect to the tape.

10. The pipeline of claim 1, wherein the coating system further comprises a corrosion-resistant layer between the pipe and the at least one thermal insulation layer.

11. The pipeline of claim 1, wherein the coating system further comprises a mechanically protective shroud on a radially outer side of the at least one thermal insulation layer.

12. The pipeline of claim 1, wherein the coating system further comprises an adhesive layer on a radially inner side of the at least one thermal insulation layer.

13. The pipeline of claim 12, wherein the adhesive layer is of thermoplastic polymer.

14. The pipeline of claim 12, wherein the adhesive layer contains elongate tensile elements of a thermoplastic polymer.

15. The pipeline of claim 1, comprising inner and outer thermal insulation layers bonded together.

16. The pipeline of claim 15, wherein the inner and outer thermal insulation layers are welded together along an interface.

17. The pipeline of claim 15, wherein the inner and outer thermal insulation layers are bonded together adhesively.

18. The pipeline of claim 17, wherein the inner and outer thermal insulation layers are bonded together by an intermediate layer of adhesive.

19. A method of applying a thermally insulating coating system to a subsea pipeline, the method comprising:
   pre-heating a steel pipe;
   applying to the pre-heated pipe at least one thermal insulation layer comprising a thermally insulating matrix that impregnates and surrounds elongate tensile elements of a thermoplastic polymer embedded in the matrix; and
   co-mingling each elongate tensile element with the surrounding, impregnating matrix to form a transition zone surrounding that element.

20. The method of claim 19, comprising selecting the pre-heating temperature to bond the elongate tensile elements with the matrix.

21. The method of claim 20, wherein the pre-heating temperature is selected to soften, activate, or liquefy at least an outer surface of the elongate tensile elements.

22. The method of claim 20, wherein the matrix is of a thermoplastic polymer and the pre-heating temperature is selected to soften, activate, or liquefy that thermoplastic polymer at an interface between the matrix and the elongate tensile elements.

23. The method of claim 20, wherein the matrix is of a thermoset polymer and the pre-heating temperature is selected to promote, initiate, or activate curing of that thermoset polymer.

24. The method of claim 19, wherein the elongate tensile elements are pre-embedded in the matrix when the at least one thermal insulation layer is applied to the pre-heated pipe.

25. The method of claim 19, comprising applying the matrix to the pre-heated pipe separately from the elongate tensile elements to form the at least one thermal insulation layer on the pipe.

26. The method of claim 25, wherein the matrix is applied to the pre-heated pipe after applying the elongate tensile elements to the pre-heated pipe.

27. The method of claim 19, comprising applying an adhesive layer to the pipe before applying the at least one thermal insulation layer to the pipe.

28. The method of claim 27, comprising embedding elongate tensile elements into the adhesive layer after applying the adhesive layer to the pipe.

29. The method of claim 19, comprising applying a corrosion-resistant layer to the pipe before applying other layers to the pipe.

30. The method of claim 19, comprising applying a mechanically protective shroud on a radially outer side of the at least one thermal insulation layer.

31. The method of claim 19, comprising pre-heating the at least one thermal insulation layer before its application to the pipe.

\* \* \* \* \*